(12) United States Patent
Bumpus

(10) Patent No.: US 12,514,648 B2
(45) Date of Patent: Jan. 6, 2026

(54) LAPAROSCOPIC ACCESS DEVICE WITH REAL-TIME MEASUREMENTS

(71) Applicant: Northgate Technologies, Inc., Elgin, IL (US)

(72) Inventor: Jacob M. Bumpus, Batavia, IL (US)

(73) Assignee: Northgate Technologies, Inc., Elgin, IL (US)

(*) Notice: Subject to any disclaimer, the term of this patent is extended or adjusted under 35 U.S.C. 154(b) by 1003 days.

(21) Appl. No.: 17/668,572

(22) Filed: Feb. 10, 2022

(65) Prior Publication Data

US 2022/0331012 A1 Oct. 20, 2022

Related U.S. Application Data

(60) Provisional application No. 63/148,975, filed on Feb. 12, 2021.

(51) Int. Cl.
*A61B 34/20* (2016.01)
*A61B 1/313* (2006.01)
(Continued)

(52) U.S. Cl.
CPC ............ *A61B 34/20* (2016.02); *A61B 1/3132* (2013.01); *A61B 34/35* (2016.02); *A61B 34/76* (2016.02); *A61B 2034/2046* (2016.02)

(58) Field of Classification Search
CPC ......... A61B 34/20; A61B 34/35; A61B 34/76; A61B 1/3132; A61B 1/00154; A61B 1/05; A61B 2034/2046; A61B 17/34; A61B 17/3404; A61B 17/3421; A61B 17/3423; A61B 17/3474; A61B 17/3403; A61B 17/3496; A61B 2034/2048;
(Continued)

(56) References Cited

U.S. PATENT DOCUMENTS

| 1,147,408 A | 7/1915 | Kells |
| 1,527,291 A | 2/1925 | Zorraquin |

(Continued)

FOREIGN PATENT DOCUMENTS

| JP | 2013075195 A | 4/2013 |
| WO | WO 1997/000043 A1 | 1/1997 |

(Continued)

OTHER PUBLICATIONS

International Search Report and Written Opinion for corresponding International Application No. PCT/IB2022/051203 mailed May 6, 2022 (11 pages).

(Continued)

*Primary Examiner* — Kevin C Sirmons
*Assistant Examiner* — Alexandra Lalonde
(74) *Attorney, Agent, or Firm* — Crowell & Moring LLP

(57) ABSTRACT

A surgical access device, such as in the form of a Veress needle or trocar/obturator, for use in providing access to a patient in a surgical setting is disclosed. The surgical access device incorporates one or more sensors to provide real-time data usable to evaluate an insertion position of the surgical access device and provide feedback to a live user or robotic insertion device. Additionally, a system and method for adjusting a flow of insufflation gas based on the real-time data and a sensed pressure at the surgical access device is described.

9 Claims, 10 Drawing Sheets

(51) Int. Cl.
*A61B 34/00* (2016.01)
*A61B 34/35* (2016.01)

(58) Field of Classification Search
CPC ...... A61B 2034/301; A61B 2017/3454; A61B
90/361; A61M 39/02; A61M 39/0208;
A61M 2039/0226; A61M 2039/0238;
A61M 2039/0244; A61M 2039/0267;
A61M 2039/0276; A61M 2025/0293;
A61M 2025/0004; A61M 2025/0175;
A61M 2025/0681; A61M 2205/60; A61M
2205/3344; A61M 2205/3334; A61M
13/00; A61M 13/003; A61M 5/158
See application file for complete search history.

(56) References Cited

U.S. PATENT DOCUMENTS

| | | | |
|---|---|---|---|
| 4,535,773 | A | 8/1985 | Yoon |
| 5,078,714 | A | 1/1992 | Katims |
| 5,098,388 | A | 3/1992 | Kulkashi et al. |
| 5,209,721 | A | 5/1993 | Wilk |
| 5,492,131 | A | 2/1996 | Galel |
| 5,833,608 | A | 11/1998 | Acker |
| 6,228,058 | B1 | 5/2001 | Dennis et al. |
| 7,752,920 | B2 | 7/2010 | Blumenkranz et al. |
| 7,963,941 | B2 | 6/2011 | Wilk |
| 9,381,067 | B2 | 7/2016 | Julian et al. |
| 10,219,874 | B2 | 3/2019 | Yu et al. |
| 10,687,829 | B2 | 6/2020 | Singh et al. |
| 2007/0181139 | A1 | 8/2007 | Hauck |
| 2012/0197078 | A1* | 8/2012 | Stanley .............. A61B 17/3474 600/109 |
| 2016/0158483 | A1 | 6/2016 | Guzman |
| 2017/0042573 | A1 | 2/2017 | Savvouras et al. |
| 2019/0206565 | A1 | 7/2019 | Shelton, IV |
| 2020/0015848 | A1 | 1/2020 | Johnson |
| 2020/0170672 | A1 | 6/2020 | Einarsson |
| 2020/0246093 | A1 | 8/2020 | Sachs et al. |

FOREIGN PATENT DOCUMENTS

| | | |
|---|---|---|
| WO | WO 1997/044089 A1 | 11/1997 |
| WO | WO 2017/151734 A1 | 9/2017 |
| WO | WO-2020040652 A1 * | 2/2020 |

OTHER PUBLICATIONS

ConMed Corporation, Core Audible Dilating Trocar and Cannula, MFR: (5 pages) Believed to have been publicly available prior to Feb. 10, 2022.

Galileo Spine Alignment Monitoring System—MiRus LLC; First Systems for Dynamically Intraoperative Measurement of Segmental and Global Spine Aligment (5 pages). Believed to have been publicly available prior to Feb. 10, 2022.

Henry Schein Medical, Needle Pneumoperitoneum Insufflation Veress 2.7×120mm Stainless Steel Ea (2 pages). Believed to have been publicly available prior to Feb. 10, 2022.

Insufflation Needles | Veress Needle | Ethicon; ENDOPATH Insufflation Needles: UV120, PN150 & PN120; ENDOPATH® 120mm Insufflation Needles Pneumoperitoneum (5 pages). Believed to have been publicly available prior to Feb. 10, 2022.

International Preliminary Report on Patentability and Written Opinion for International Application No. PCT/IB2022/051203 dated Aug. 15, 2023 (8 pages).

* cited by examiner

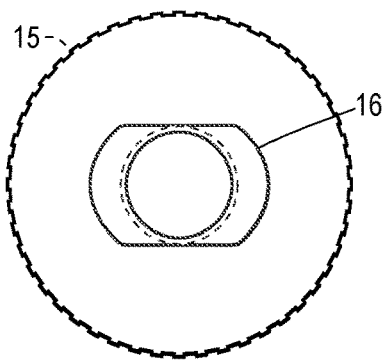
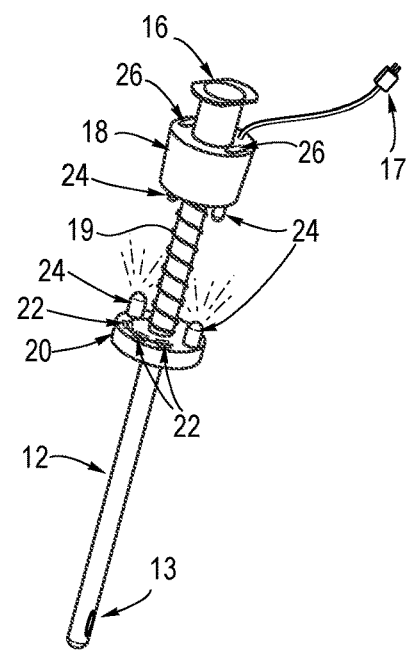
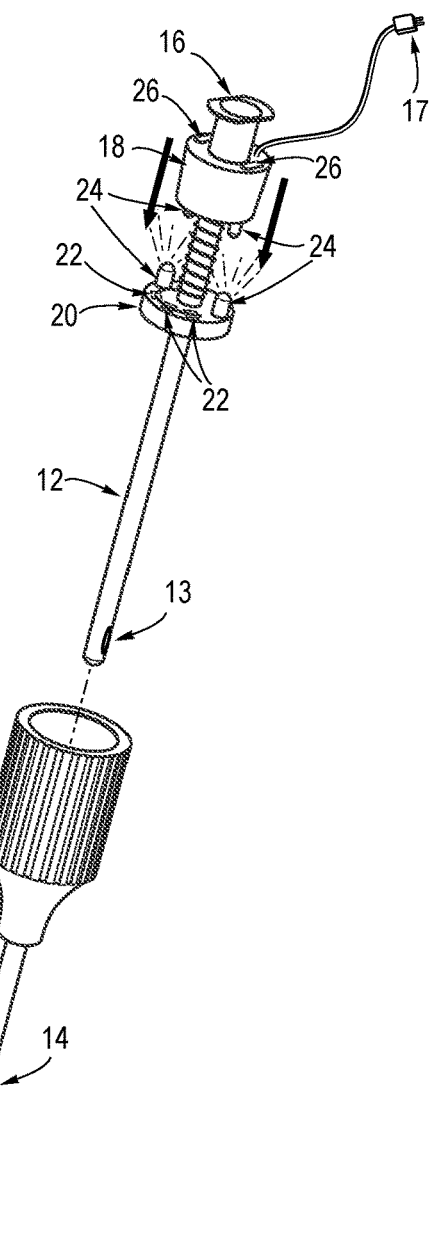

LAPAROSCOPIC ACCESS DEVICE WITH REAL-TIME MEASUREMENTS

CROSS-REFERENCE TO RELATED APPLICATIONS

This application claims the benefit of U.S. Application Ser. No. 63/148,975, filed Feb. 12, 2021, the entirety of which is hereby incorporated herein by reference.

FIELD OF THE DISCLOSURE

The present disclosure relates to devices for use surgical settings and, more particularly, to a laparoscopic access device.

BACKGROUND

In the field of laparoscopic surgery, it is common practice to fill the patient's abdominal cavity with a gas such as carbon dioxide, a process known as insufflation, and the resulting volume of enclosed gas is known as pneumoperitoneum. This is an essential step, as it creates a space in which a surgeon may visualize local anatomy and perform the surgery. To create a pathway to begin insufflation, the three most common methods are use of a Veress needle, the open or Hasson technique, or direct optical trocar insertion. With all primary access techniques, it is important to ensure that no visceral damage is done as the abdominal wall is punctured. Additionally, the tip of the primary access device should be confluent with the peritoneal cavity before starting insufflation, to avoid insufflation of or creation of other cavities, such as subcutaneous or mediastinal emphysema, or unintentional pneumothorax.

BRIEF DESCRIPTION OF THE DRAWINGS

FIG. 3 is a top view of the laparoscopic access device depicted in FIG. 2.

FIG. 4 is an exploded view of the proximal end of the laparoscopic access device depicted in FIG. 1.

FIG. 5 is an exploded of the laparoscopic access device of FIG. 1 in the actuated position depicted in FIG. 2.

DETAILED DESCRIPTION

Figure 1:
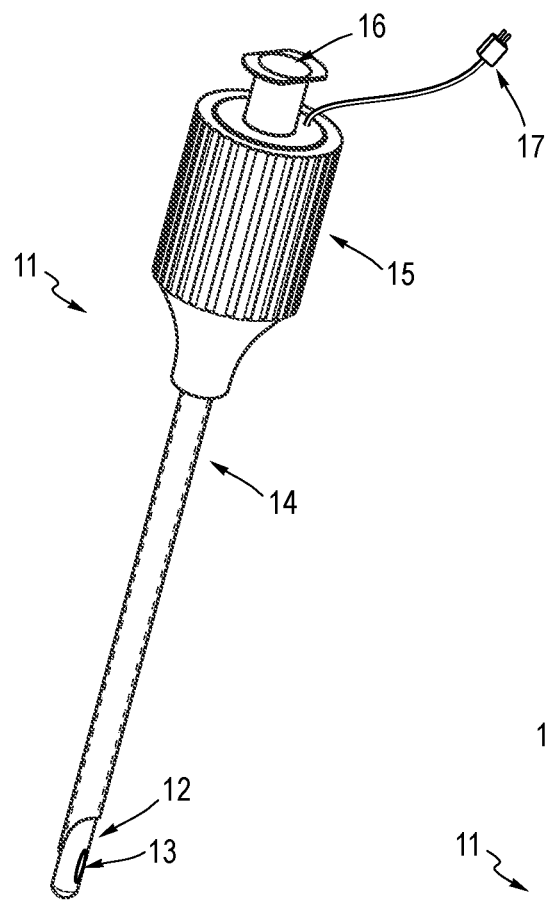
FIG. 1 is an isometric view of an embodiment illustrating a laparoscopic access device having Veress needle-type construction.

In order to address the challenges of prior approaches, a surgical access device, such as a Veress needle or trocar, is disclosed herein which provides real-time data for improved insertion precision and insufflation gas flow control.

In one implementation, a surgical access device may include an elongated tubular body having an outer sheath with an outer sheath proximal end and an outer sheath distal end. An inner sheath may be positioned inside the outer sheath, where the inner sheath is slidably movable coaxially relative to the outer sheath. The outer sheath distal end may include a sharpened point and the outer sheath proximal end may be attached to an access device gripping portion having an outer diameter greater than an outer diameter of the outer sheath. The inner sheath may be a hollow tubular member having a blunt distal end and a proximal end defining a gas port, where the inner sheath defines a lumen extending between the gas port and an exit port positioned adjacent the blunt distal end. A first flange may be movably positioned inside the access device gripping portion and fixedly attached to the inner sheath adjacent the proximal end of the inner sheath, while a second flange positioned inside the access device gripping portion is slidably movable along an axis of the inner sheath via a biasing member attached to the first flange and positioned between the first flange and the second flange. At least one first sensor may be mounted to the first flange, and at least one second sensor may be mounted to the second flange and configured to cooperate with the at least one first sensor to generate and transmit real-time data relating to one or more of a displacement of the outer sheath relative to the inner sheath, an orientation of the surgical access device, or an acceleration of the surgical access device.

According to another aspect, a system for minimally invasive surgical procedures is disclosed herein. The system may include an insufflation source having a pneumatic pressure sensor, a computer network, a user interface, and a controller in communication with the insufflation source, the computer network and the user interface. The system may further include a surgical access device in communication controller and in pneumatic communication with the insufflation source. The surgical access device may include an elongated tubular body having a longitudinal axis, where the tubular body has an outer sheath, an inner sheath coaxially positioned inside the outer sheath and slidably moveable relative to the outer sheath along the longitudinal axis, and a gripping portion fixedly attached to the outer sheath. The inner sheath may define a lumen for transporting a gas between an opening at a distal end of the inner sheath and a gas port at a proximal end of the inner sheath. A plurality of sensors attached to the surgical access device and in communication with a data port on a proximal end of the surgical access device may include a force sensor, an inertial monitoring sensor or an optical sensor. The plurality of sensors are configured to communicate real-time data with the controller via the data port. The controller is configured to determine a position of the surgical access device and control a gas flow from the insufflation source based on the real-time data from the surgical access device and a pressure sensed by the pneumatic pressure sensor of the insufflation source.

In yet another aspect, a method for performing a laparoscopic surgical operation is described. The method may include inserting a laparoscopic access device, the laparoscopic device having an insertion tube comprising an outer sheath slidably connected to an inner sheath, into an abdominal wall of a patient. While inserting the laparoscopic access device, several features are automatically monitored, including displacement of the outer sheath relative to the inner sheath, and an orientation and an acceleration of the laparoscopic access device via at least one inertial measurement sensor embedded into the laparoscopic access device. The method further includes transmitting, to a controller in communication with the laparoscopic access device, real-time data relating to the monitored displacement, orientation and acceleration. Feedback may then be provided to a user of the laparoscopic access device regarding positioning of the laparoscopic access device based on the transmitted real-time data.

When using a Veress needle, insufflation is typically started before laparoscopic visualization, and thus the user cannot visually confirm entry of the Veress needle into the peritoneum. However, there are multiple other indications of proper placement:
1. As the needle passes through the fascia and parietal peritoneum, respectively, two "clicks" should be felt and/or heard by the surgeon.
2. The needle should aspirate easily with a syringe, and saline should drop into the abdominal cavity after irrigation with 1-2 milliliters (mL) and subsequent removal of the syringe.
3. The needle should be able to be advanced without feeling resistance.
4. When the needle is connected to a carbon dioxide ($CO_2$) insufflator, the opening pressure should read<10 millimeters of mercury (mmHg) (typically 5-7 mmHg) prior to beginning insufflation.
5. The creation of peritoneum should require 3-5 liters (L) of $CO_2$ for a typical adult. The volume dispensed is typically indicated on the insufflator.

While adherence to this sequence of steps reduces risk of subcutaneous emphysema and extraperitoneal insufflation, it requires manual perceptivity on the part of the user at steps 1 and 3 above and may be more precisely detectable through the use of an electromechanical sensor(s). Additionally, the opening pressure observed in step 4 may vary based on the body mass of the patient, potentially causing false-negative placement indications, especially in bariatric patients.

Additionally, in contrast to prior art techniques, which may be susceptible to false positive errors due to a physician pausing in the application of force, embodiments of the present invention may be more robust against such error conditions. This is because the time-series profiles for both applied force and acceleration would not be subject to the same conflation of the true and false positive, and because the embodiments of the present application may incorporate a distance sensor which further distinguishes cavity wall resilience during a surgeon pause from true peritoneal access (the former situation never exhibiting the increase, transient or permanent, in the tip-to-tissue distance which accompanies the latter). This robustness may reduce operator complexity as compared to some prior approaches.

The description and drawings below illustrate a laparoscopic access instrument, for example in the form of a Veress needle-type assembly or a trocar-type assembly, which may be formed with a pointed tip with a retractable, blunt inner sheath, or a blunt outer sheath with a retractable pointed inner tip. Features of the laparoscopic access device may include one or more sensors for identifying a position of the access device relative to the peritoneal cavity wall. These sensors may include the ability to detect one or more of a distance to tissue, device orientation, device acceleration, the force applied between tissue and device, opening pressure (i.e., intracorporeal pre-insufflation pressure), and pneumo pressure (i.e., insufflation pressure).

It is contemplated that different embodiments of the access device include the capability of detecting only one of the above-noted criteria, or combinations of two or more of the above-noted criteria. Separate sensors may be incorporated in or on the laparoscopic access device for each sensing criteria, or a given sensor may be configured to sense more than one of the criteria. Also, the laparoscopic access devices disclosed may be combined with, or connected to, a processor that provides insufflation control input (i.e., using sensed data to determine when to turn on insufflation) for controlling an insufflator. Different implementations of the laparoscopic access device may also be in manual minimally invasive procedures or in robotic minimally invasive procedures (i.e., used with a mechanical actuator). In yet other embodiments, the laparoscopic access device disclosed herein may be used with anatomical data, such as data from magnetic resonance imaging (MRI) or computed tomography (CT) devices for more accurate procedures. Finally, the disclosed laparoscopic access device may be utilized to in the collection and analysis of population data. Such collected data may be used to train one or more machine learning models for increased accuracy.

To create a safer, more user-friendly experience for achieving primary access, this disclosure describes an access device which measures axial force, longitudinal strain, acceleration, distance and/or opening pressure data to precisely identify the instant of peritoneal penetration as well as the proximity of the distal tip of the access device to the visceral and other intraperitoneal organs and tissues.

This access device may also be configured to communicate this information to an insufflator which is capable of synthesizing it with synchronous pressure measurements made through the insufflation tubing and access device, which may be used both to improve the identification of peritoneal penetration, as well as to regulate insufflation flow to begin after confirmation of proper position of the access device, thereby minimizing the risk of unintentional subcutaneous or mediastinal emphysema, or pneumothorax.

In the field of manual minimally invasive surgery, this access device may also be connected other equipment, including devices capable of generating audio, visual or haptic indicators, to guide the user during placement of the access device. This minimizes the insertion distance of the access device that is required to achieve confluence and begin insufflation, thereby minimizing the risk of damage to intraperitoneal organs and tissues.

In robotic minimally invasive surgery, the access device may be used to provide feedback to the robotic control apparatus which may be used to place the device. Use of a robotic or other system involving mechanized actuation of the device would allow independent actuation of the inner and outer sheaths of a Veress needle-type construction access device. This would allow for a sharp inner sheath to be retracted while a blunt outer sheath is used to safely probe tissues to confirm location of the puncture. Additionally, for a trocar/obturator-type construction, independent actuation of a sharp inner obturator and blunt outer trocar cannula would afford similar benefits.

The data from this access device may also be synthesized with anatomical data, such as MRI or CT scans, to relate information about the distance which the device has traversed through the abdominal wall, and/or the remaining distance to the closest intraperitoneal organs or tissues, with visual renderings of the patient's individual anatomy. Additionally, the parameters which the device measures may be transmitted to a computer system within the device or outside the device which processes the information to generate a comparison of the measured parameters of this patient with those of similar patients and those of the broader patient population, allowing the user to achieve greater confidence of proper placement and minimize the likelihood of falsely interpreting data such as high opening pressure as an indication of improper access device placement. Furthermore, such data may be logged and incorporated into broader analyses of clinical workflow to help to minimize the incidence of complications during creation of the initial surgical site access.

Reference is now made to the following drawings. FIGS. 1-5 illustrate one embodiment of a laparoscopic access device. FIG. 1 shows an isometric view of a Veress needle-type construction embodiment of a laparoscopic access device 11 in a neutral position. The laparoscopic access device 11 includes a blunt ended inner sheath 12 slidably positioned within a sharp ended outer sheath 14, where the inner and outer sheaths 12, 14 extend to the distal end of the laparoscopic access device 11. When the device 11 is in the neutral position illustrated in FIG. 1, the blunt end of the inner sheath 12 is exposed such that the gas introduction orifice 13 positioned on the side of the distal end of the blunt inner sheath is exposed, and thus open, extending out past the sharp outer sheath 14. In the neutral position, the outer sheath 14 does not extend past the inner sheath 12, such that the sharp point at the distal end of the outer sheath does not reach past the end of the blunt inner sheath 12. Toward the proximal end of the device 11, a grasping surface 15 is formed on the outer circumference of the device 11 and connected with the outer sheath 14 in a fixed, contiguous manner. The grasping surface 15 may be a textured, for example ribbed, surface that provides a region that may be securely grasped by a user. A pneumatic connection port 16 is positioned at the proximal end of the laparoscopic access device 11 allowing fluid communication from an external fluid source through the inner sheath 12 to the gas introduction orifice 13. Additionally, an electrical and/or data connection port 17 may also be positioned at the proximal end of the device 11 to provide power and/or data access to an external power and/or data processing source.

Figure 2:
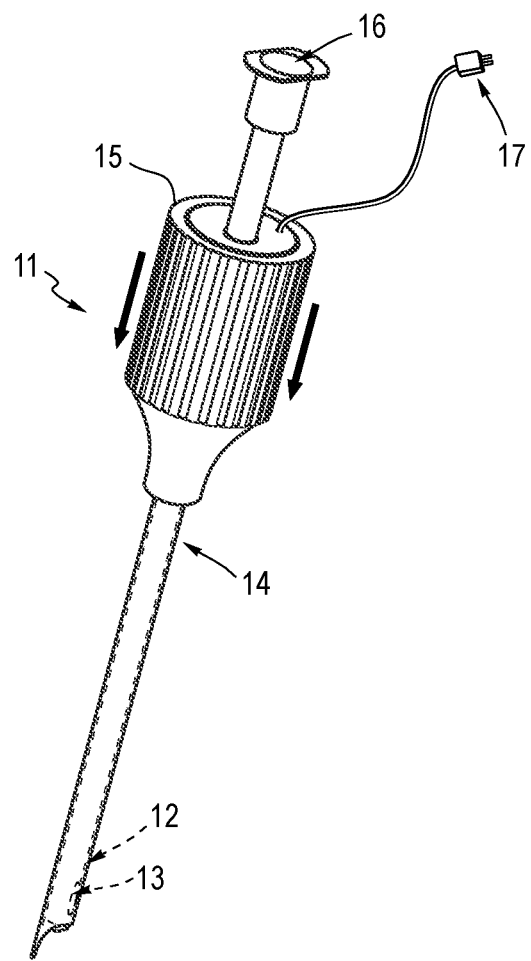
FIG. 2 is an isometric view of the laparoscopic access device of FIG. 1, in an actuated position.

FIG. 2 shows the laparoscopic access device 11 in the actuated position, where a user holding the device 11 by the grasping surface and pushing the device 11 into tissue to be pierced applies a pressure against the distal end of the blunt ended inner sheath 12 and causes the inner sheath 12 to slide back into the rigid outer sheath 14. When the inner sheath 12 is pushed up into the outer sheath 14, the sharp end of the outer sheath 14 is exposed so that it can help pierce through the tissue that the device 11 is being inserted into. While in the actuated position, the retraction of the inner sheath, which is mechanically connected with the pneumatic orifice via a lumen, causes the gas introduction orifice 13 to be blocked by the outer sheath 14 and exposes more of the lumen for the fluid proximal to the grasping surface 15. Thus, in the actuated position of FIG. 2, the outer sheath 14 moves with the grasping surface 15, as they are rigidly mechanically connected together, when the device is moved into a surface, while the inner sheath slidably retracts into the outer sheath in response to contact with tissue. FIG. 3 illustrates the opening of the pneumatic connection port 16 at the proximal end of the laparoscopic access device 11.

Exploded views of the device 11 with the inner sheath in the neutral position and in the actuated position are illustrated in FIGS. 4-5. The body of the device 11 defined by the outer sheath 14 is movably connected to the inner sheath 12 by a spring-loaded actuation platform 18. The spring-loaded actuation platform 18, or second flange, may be an annular or ring-shaped collar that slidably surrounds an upper portion of the lumen of the inner sheath 12. When assembled, the spring-loaded actuation platform 18 is rigidly attached with the body of the outer sheath 14, while the inner sheath 12 remains slidably moveable relative to the outer sheath and spring-loaded actuation platform. The rigid attachment between the spring-loaded actuation platform 18 and body of the outer sheath 14 may be achieved in any of a number of different ways, for example, via a threaded connection, friction fit or an adhesive. A spring 19 captured between the spring-loaded actuation platform 18 and a base platform 20, or first flange, that is fixedly attached to the lumen of the inner sheath 12, biases the spring-loaded actuation platform 18 away from the base platform 20 when the laparoscopic access device 11 is in a neutral position (FIGS. 1 and 4) such that the blunt distal end of the inner sheath 12 and the gas introduction orifice 13 facing perpendicular to the blunt end extend beyond the sharp end of the outer sheath of the laparoscopic access device 11. In one implementation, when the laparoscopic access device 11 is moved into a barrier such as when the laparoscopic access device 11 first meets the surface of the tissue through which the device 11 is being inserted, the first point of contact is the blunt end of the inner sheath 12 which is pushed back into the outer sheath, thereby compressing the spring 19 between the spring-loaded actuation platform 18 and base platform 20 (See FIG. 5).

To help track the position of the laparoscopic access deice 11 and/or velocity of the insertion, various sensors may be included in the device 11. For example, one or more force/pressure sensors 22 may be positioned sense the force transmitted through the inner sheath 12 to the outer sheath 14. The force/pressure sensors 22 may be positioned internally on or adjacent to the base platform 20 of the inner sheath 12 so that, as the spring-loaded actuation platform 18 is actuated, force applied through its spring to the force/pressure sensors 22 increases. Additionally, one or more optical sensors 24, for example in the form of sensor/emitter pairs positioned internally and on opposing faces of the spring-loaded actuation platform 18 and base platform 20, may be positioned in the laparoscopic access device 11 to detect relative displacement of the inner sheath 12 to the outer sheath 14. As the spring-loaded actuation platform 18 is actuated, the optical sensors 24 are brought closer together and there is increased optical transmission from one to the other (for example from emitter to sensor of a given optical sensor pair). Further, one or more inertial measurement units 26 (IMUs) may be placed in the proximal end of the body of the outer sheath, for example adjacent to or on the spring-loaded actuation platform 18 that is fixedly positioned at the proximal end of the body of the outer sheath 14, on or adjacent to the base platform 20 fixedly attached to the inner sheath 12, or on both platforms 18, 20. Each IMU 26 may comprise one or more of an accelerometer, gyroscope and/or magnetometer.

Figure 6:
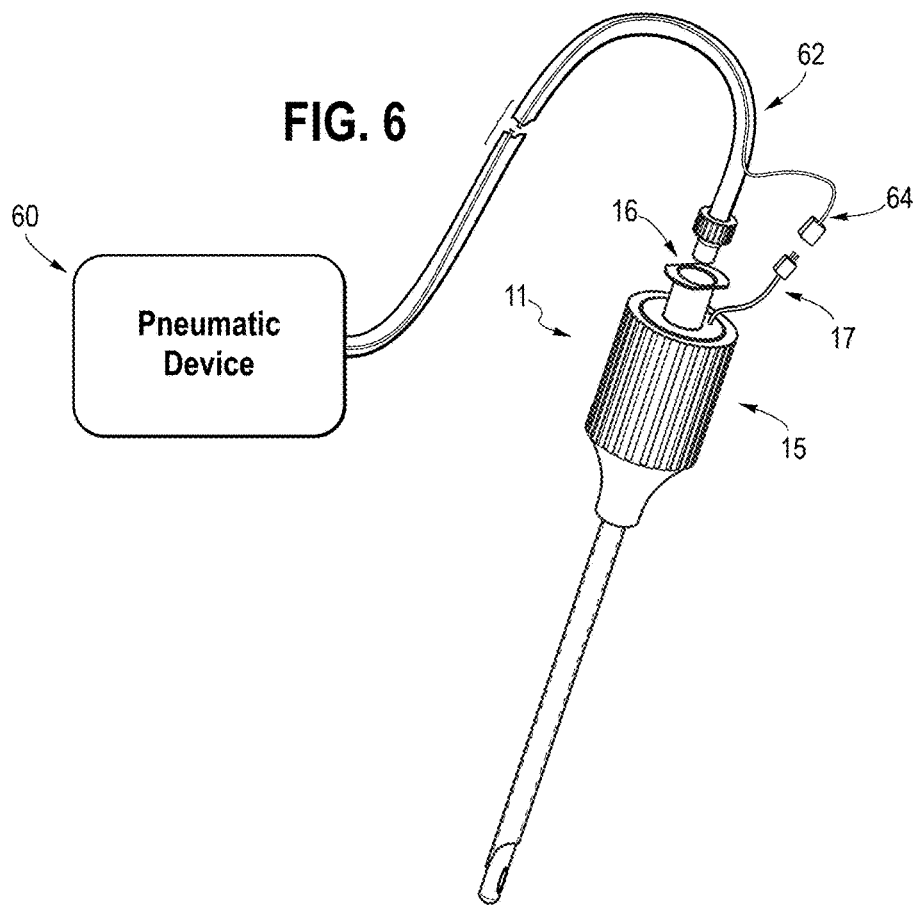
FIG. 6 is an isometric view of the laparoscopic access device of FIG. 1, illustrating its pneumatic and electrical interfaces.

Referring to FIG. 6, the embodiment of FIGS. 1-5 may be connected with an external pneumatic device 60, for example an insufflator. The pneumatic device 60 may provide a fluid to the laparoscopic access device 11 via a pneumatic conduit 62 having a fitting sized to cooperate with the pneumatic connection port 16 at the proximal end of the laparoscopic access device 11. Similarly, one or more electrical conduits 64 from the pneumatic device 60 may attach to the electrical and/or data connection port 17 on the laparoscopic access device 11. The electrical conduits 64 may provide a data communication path between the sensors and IMUs in the laparoscopic access device 11 and control and/or processing circuitry in the pneumatic device 60. In addition, power for the sensors and IMUs may be supplied from the pneumatic device 60 over the one or more electrical conduits 64. In an alternative embodiment, the power for the sensors and/or IMUs may be provided via a battery mounted internally or externally to the body of the outer sheath 14 that may be replaceable or rechargeable.

Figure 7:
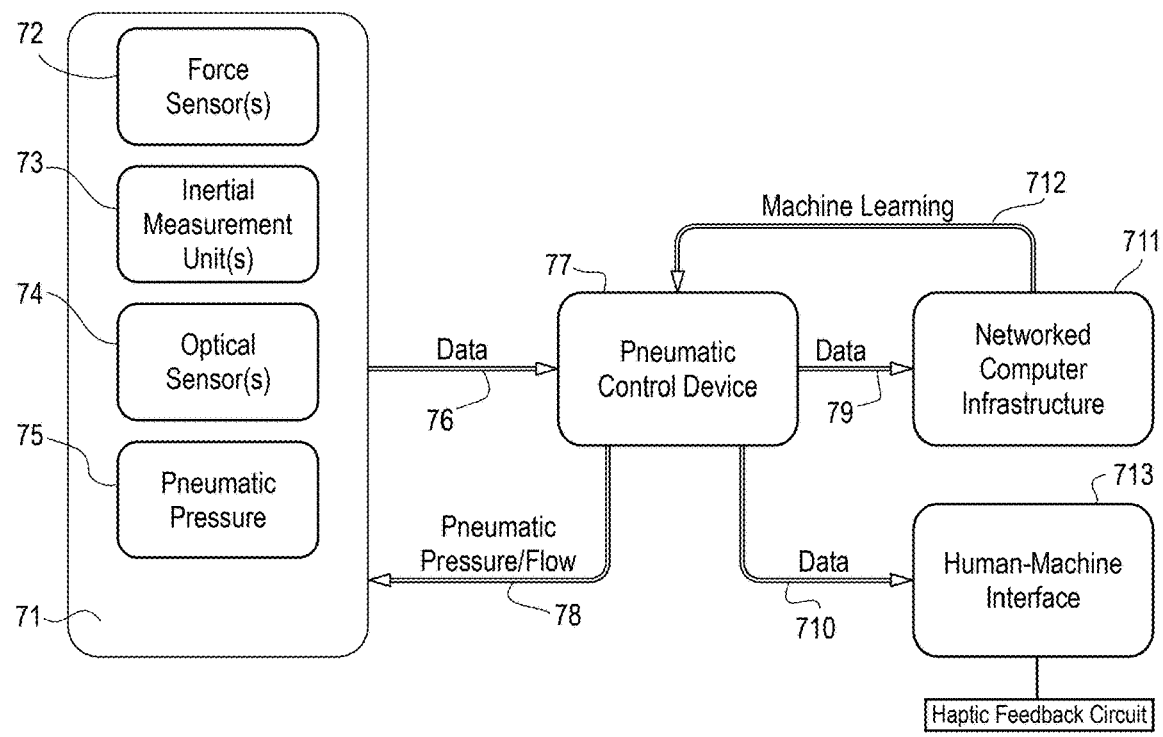
FIG. 7 is a block diagram illustrating aspects of a system-implemented method for collecting and processing perioperative data, such as that acquired during creation of initial pneumoperitoneum using a laparoscopic access device.

Utilizing a version of a laparoscopic access device 11 such as discussed above with respect to FIGS. 1-6, a data flow diagram for a system incorporating a laparoscopic access device 71 is shown in FIG. 7. FIG. 7 illustrates aspects of such a system collecting and processing perioperative data, such as those acquired during creation of initial pneumoperitoneum. The various pieces of information gathered by the device 70, through the various sensors such as force sensors 72, inertial measurement units 73, optical sensors 74, and pneumatic pressure sensors 75, may be sent as data 76 over a wired (e.g., electrical conduits 64) and/or wireless link to a pneumatic control device 77. The pneumatic control device 77 may be integrated into or may be separate controller from, the pneumatic device 60. The pneumatic control device 77 may use the data 76 received from the laparoscopic access device 71 to control the pressure, flow and or other aspects of the fluid being provided to the laparoscopic access device 71 over path 78. The data may be sent/accessed from the laparoscopic access device and processed in real-time such that one or both of insertion position feedback information may be provided to a user or a robotic positioning device and/or precision control of the insufflator and fluid flow/pressure to the device may be achieved.

As noted previously, some or all of the data 76 received by the pneumatic control device 77, may be sent as-is, or as further processed by the pneumatic control device 77, as data 79 to a networked computer architecture 711 to be utilized to in the collection and analysis of population data. Such collected data may be used to train one or more machine learning models for increased accuracy. After training a machine learning model, the trained model or parameters to update an existing model, may be sent back from the networked computer architecture to the pneumatic control device 77 (as 712) to control or fine tune machine learning models associated with use of the laparoscopic access device 71 and other system components for different laparoscopic procedures. The pneumatic control device 77 may also provide data 710 to a human-machine interface 713, which may provide visual, audible and/or haptic feedback to the user, for example, instructing the user to cease further introduction of the access device, or otherwise informing the user about the outcome of the process.

Figure 8:
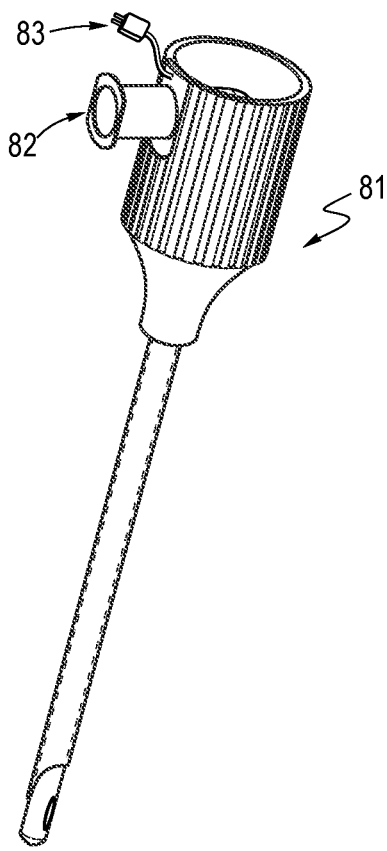
FIG. 8 illustrates an alternative embodiment of the Verres needle-type construction laparoscopic access device of FIG. 1.
Figure 9:
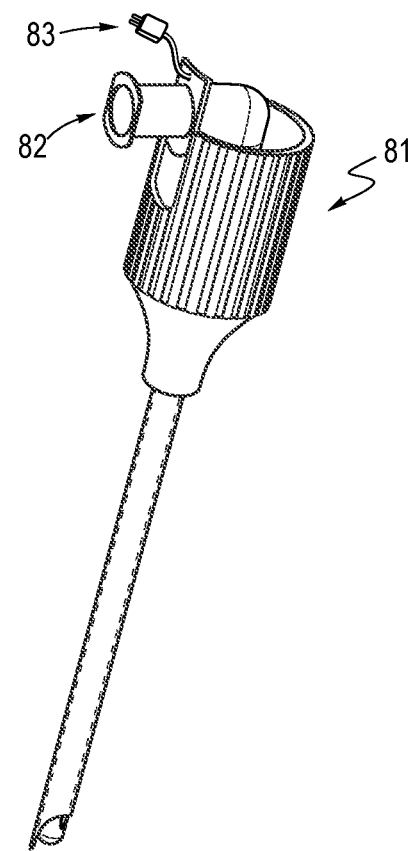
FIG. 9 is an isometric view of the laparoscopic access device of FIG. 8, in an actuated position.
Figure 10:
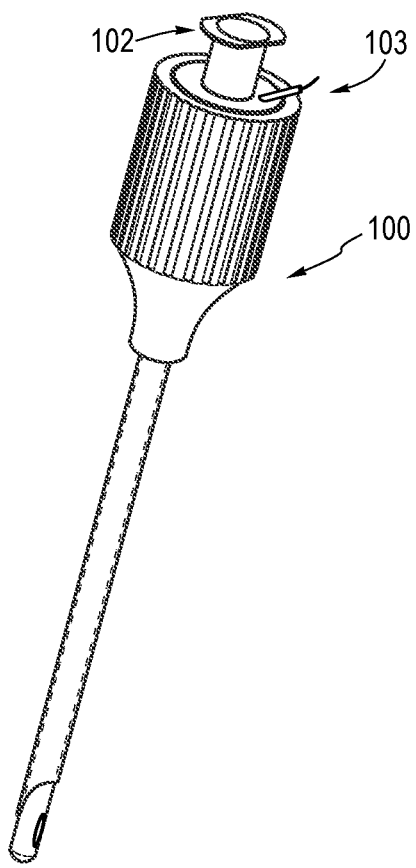
FIG. 10 Illustrates an additional alternative embodiment of the Veress needle-type construction laparoscopic access device of FIGS. 1-2.

Other embodiments and sensor configurations related to a Veress needle-type laparoscopic access device are contemplated. For example, an alternative version of the laparoscopic access device 81 is shown in FIGS. 8-9, where an overall Veress needle form and actuation arrangement from the version of FIGS. 1-6 is retained, but the configuration of the pneumatic port 82 and electrical and/or data connection port 83 are altered to be at the side of the device (at a perpendicular angle to the longitudinal axis of the device 81 rather than parallel to the longitudinal axis as shown in FIGS. 1-6). To accommodate the side-facing version of the connection ports 82, 83, a slot may be formed in the gripping surface of the body of the outer sheath to accommodate movement of the outer sheath relative to the connection ports 82, 83. The ports 82, 83 are connected with the structure of the inner sheath as best seen in the different positioning illustrated in FIG. 8 where the laparoscopic access device 81 is in a neutral position and FIG. 9, where the laparoscopic access device 81 is in an actuated position. In another implementation, as illustrated in FIG. 10, a Veress-needled type of laparoscopic access device 101 may include a wireless communication module 103 next to the pneumatic connection port 102, rather than a wired electrical connection port, to wirelessly communicate data from the sensors in the access device to one or more outside data processing and/or control systems.

In yet other embodiments, the device versions of FIG. 1-6, or 8-10 may use different sensors configurations, in addition to or independently of those described above, to provide force or position data relating to insertion of a laparoscopic access device. In one such embodiment shown in FIG. 11, the blunt inner sheath 111 may include, in addition to a gas introduction orifice 112 on a side of the inner sheath 111, mechanical gradations 114 that may be sensed or counted by a switch arrangement positioned on the inside of the sharp ended outer sheath 113. For example, the switch arrangement may be an electrical switch lever 115 that moves about a hinge point 116 fixed to the inside of the outer sheath 113. The movement of the mechanical gradations 114, which may be evenly spaced ridges, gear teeth or any other regular topology, against the electrical switch lever 115 that may actuate the switch arrangement and those actuations may then be counted or otherwise used to calculate sheath displacement.

Figure 12:
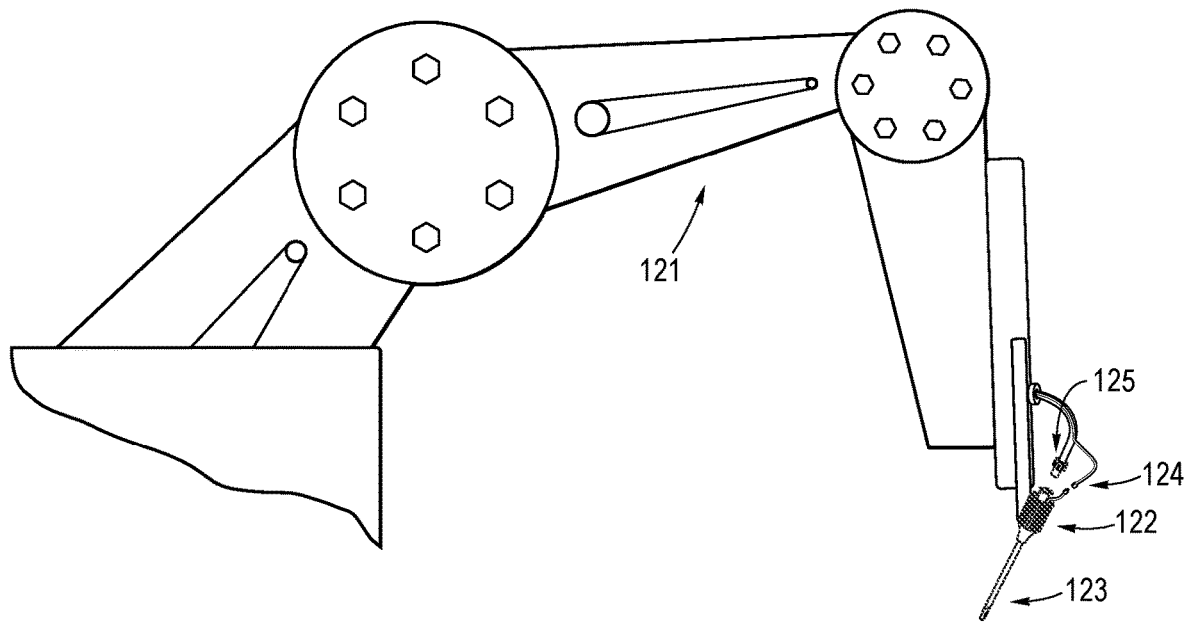
FIG. 12 is an isometric view of a Veress needle-type construction laparoscopic access device such as illustrated in FIGS. 1-2 positioned on a mechanical actuator (e.g. a robotic arm).

The Veress needle-type laparoscopic access device versions described above may be used manually or may be arranged for attachment to a mechanical actuator (e.g. a robotic arm). As shown in FIG. 12, an embodiment of a Veress needle-type laparoscopic access device 123 modified for attachment to a mechanical actuator may include an attachment sheath 122. The attachment sheath may be fixed to the sharp outer sheath of the Veress needle-type construction access device and may be detachably fixed to an adapter or arm of the mechanical actuator 121. Electrical conduit(s) 124 from the mechanical actuator 121 are situated to conduct signals from the access device 123 to the mechanical actuator's control system and/or a gas dispensing system (not shown). Similarly, pneumatic conduit(s) 125 from the mechanical actuator 121 are situated to conduct gas and/or pressure between the access device 123 and the mechanical actuator's control and/or pneumatic system(s).

Figure 13:
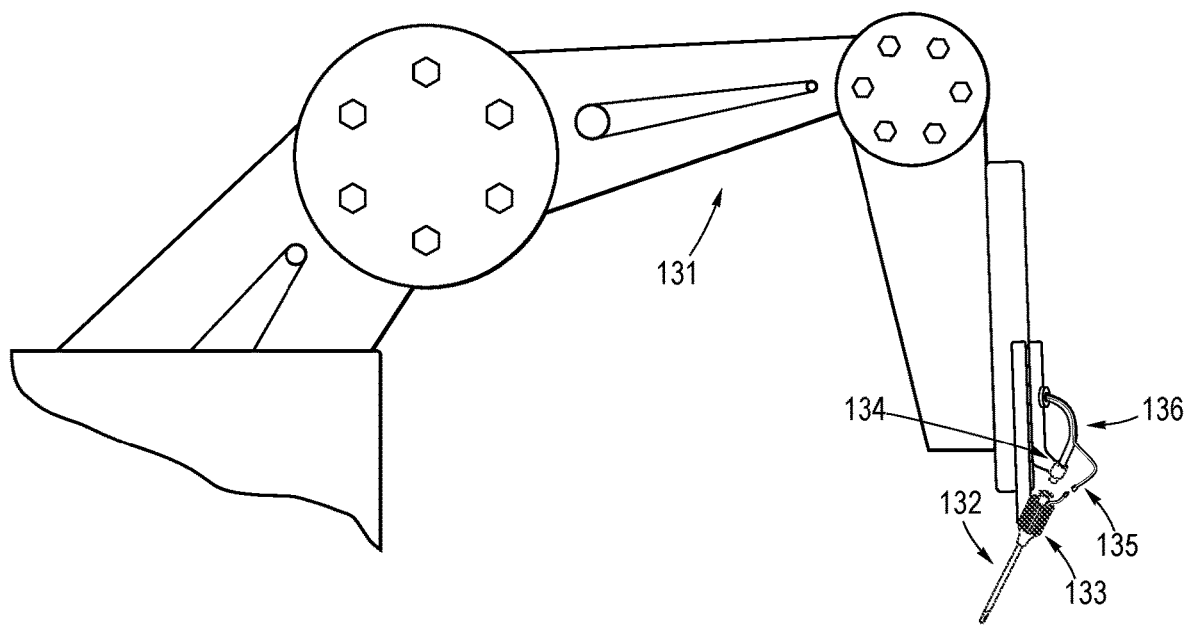
FIG. 13 is an alternative embodiment of the system of FIG. 12 and illustrates an isometric view of a Veress needle-type construction laparoscopic access device such as illustrated in FIGS. 1-2 positioned mechanical actuator (e.g. a robotic arm), wherein the mechanical actuator may independently actuate the inner and outer sheaths of the laparoscopic access device.

Referring to FIG. 13, an alternative implementation of the embodiment of the mechanical actuator mounted version of FIG. 12 is shown. As seen in FIG. 13, a Veress needle-type laparoscopic access device 132 is arranged for attachment to a mechanical actuator 131, where the mechanical actuator 131 may independently actuate the inner and outer sheaths of the laparoscopic access device 132. In this embodiment, both an outer attachment sheath and actuator 133, which is fixed to the sharp outer sheath of the laparoscopic access device 132, and an inner attachment sheath and actuator 134, which is fixed to the blunt inner sheath of the laparoscopic access device 132 are included. These separate outer and inner attachments 133, 134 allow for separate, independent control of both the outer and inner sheaths. Electrical conduit(s) 135 from the mechanical actuator 131 are situated to conduct signals from the access device 123 to the mechanical actuator's control system and/or a gas dispensing system (not shown). Similarly, pneumatic conduit(s) 136 from the mechanical actuator 131 are situated to conduct gas and/or pressure between the access device 132 and the mechanical actuator's control and/or pneumatic system(s).

Figure 14:
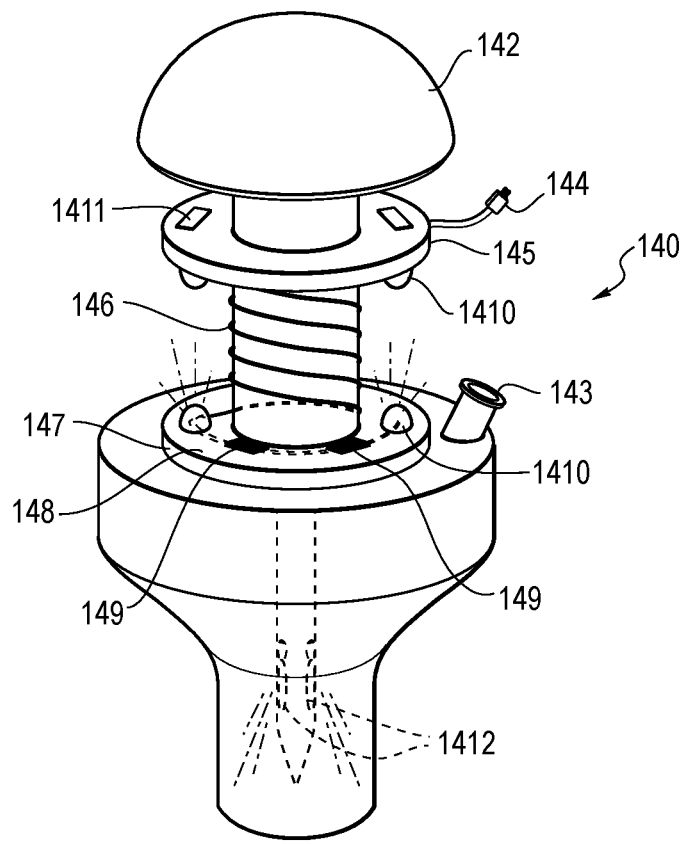
FIG. 14 illustrates an alternative embodiment of the laparoscopic access device of FIGS. 1-11 utilizing a trocar/obturator-type construction.

Laparoscopic access device configurations other than the Veress needle-type laparoscopic access device versions described above are also contemplated. A trocar/obturator-type laparoscopic access device 140 is illustrated in FIG. 14. The device 140 includes an obturator 142 inserted within a trocar 141 in the neutral position. A pneumatic connection port 143 and an electrical and/or data connection port 144 may be positioned on different portions of the device 140. A spring-loaded actuation platform 145, or second flange, may be contiguously fixed to the obturator 142. A spring 146 may be positioned around the shaft of the obturator 142 and captured between the actuation platform 145 and a base platform 147, or first flange. The base platform 147 may be attached to the spring 146 but longitudinally translatable along the obturator shaft. The base platform 147 may have an outer diameter larger than the inner diameter of the trocar 148 (dotted line) such that it creates an interference at the top of the trocar 141, thereby enabling compression of the spring 146 as the obturator 142 is pressed downward and the spring-loaded actuation platform 145 approaches the base platform 147.

Figure 15:
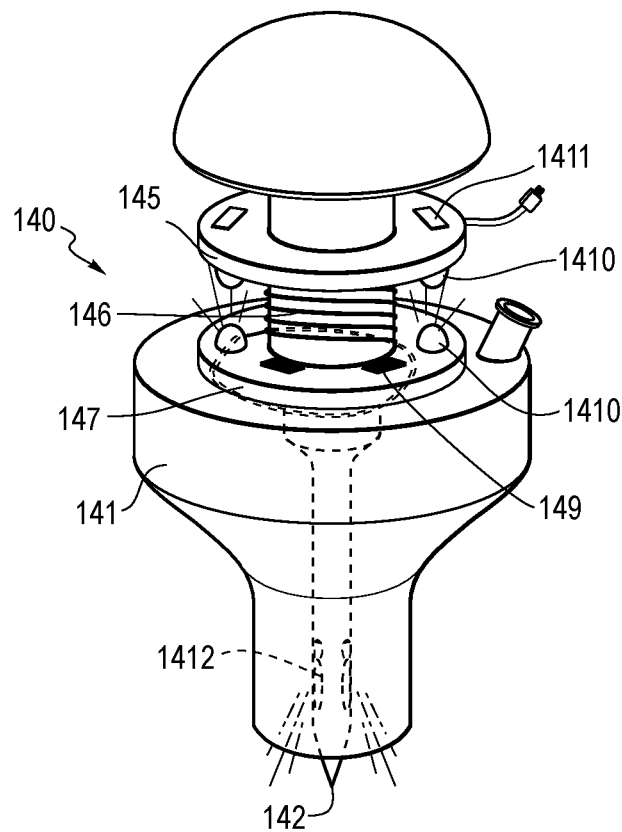
FIG. 15 illustrates the laparoscopic access device of FIG. 14 in the actuated position.

Different sensors are deployed about the device 140 to measure force and displacement on parts of the trocar/obturator-type laparoscopic access device 140. Force/pressure sensors 149 positioned at the base platform 147 may sense the force transmitted through the inner sheath (obturator 142) to the outer sheath (trocar 141). As the actuation platform 145 is actuated downward, force applied through its spring 146 to the force sensors 149 increases. Additionally, one or more optical sensors 1410, which may be in the form of sensor/emitter pairs, detect relative displacement between inner and outer sheaths 142, 141. As the actuation platform 145 is actuated, the optical sensor pair is brought closer together and there is increased optical transmission from one to the other. One or more inertial measurement units (IMUs) 1411 may be located in the proximal end of the body of the outer sheath. IMUs may be placed in the either or both platforms 145 and 147. Each IMU may comprise one or more of the following: an accelerometer, a gyroscope and/or a magnetometer. Additionally, one or more optical emitter/detector pairs may be placed within the distal end of the obturator 142 to detect reflectance off nearby tissue(s) to measure distance. FIG. 15 illustrates the trocar/obturator-type laparoscopic access device 140 of FIG. 14 with the obturator 142 in the actuated position where the distal pointed end of the obturator 142 extends out from, and past the blunt end of, the distal end of the trocar 141.

Figure 16:
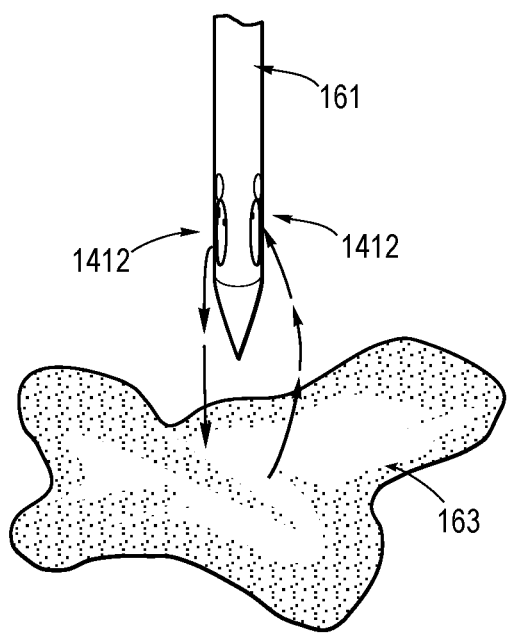
FIG. 16 is a sectional view of the obturator at the distal end of the laparoscopic access device of FIGS. 14-15 positioned over nearby tissue.
Figure 17:
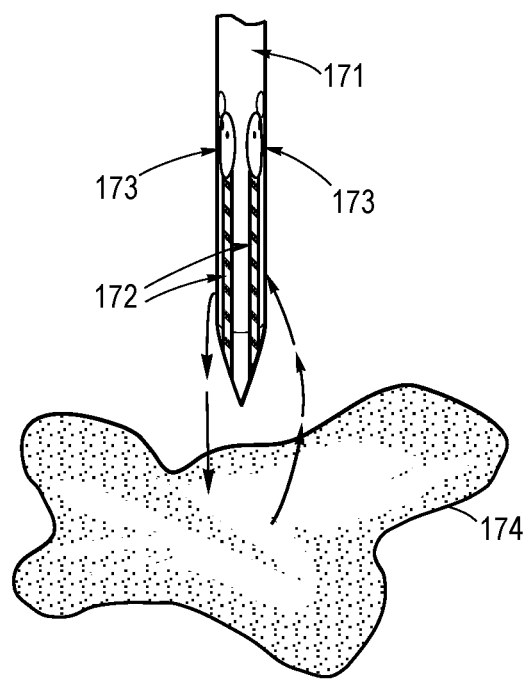
FIG. 17 is a cross-sectional view of an alternative embodiment of the distal end the obturator of FIG. 16.

The distal end 161 of the obturator 142 is shown in FIG. 16. In one implementation, the obturator 142, or at least the distal end 161 of the obturator 142, is constructed of a transparent material. One or more optical emitter/detector pairs 1412 may be placed within the distal end 161 of the obturator 142 to detect reflectance off nearby tissue(s) 163 to measure distance. In an alternative embodiment of the distal end of a trocar/obturator-type laparoscopic access device shown in FIG. 17, the obturator material may be non-transparent. In this non-transparent obturator embodiment, longitudinal channels 172 formed through the tip of the obturator 171 allow passage of light through the wall of the obturator 171. One or more optical emitter/detector pairs 173 may be placed within the distal end of the obturator in the longitudinal channels 172 to detect reflectance off nearby tissue(s) 174 to measure distance.

Figure 18:
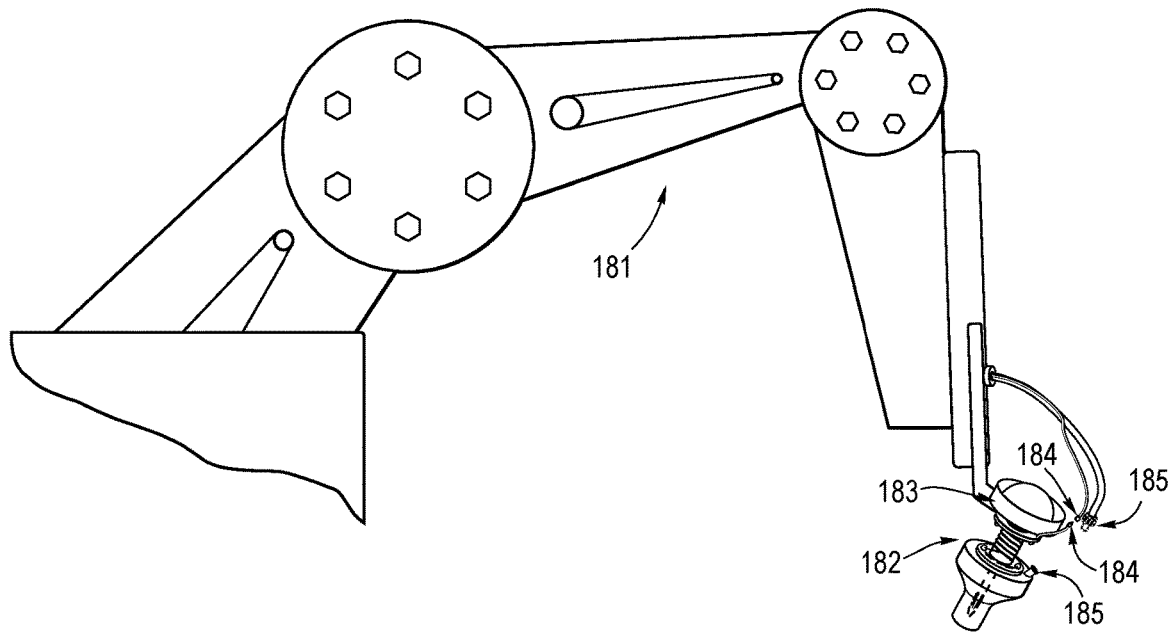
FIG. 18 illustrates a system including the laparoscopic access device of FIGS. 14-15 arranged for attachment to a mechanical actuator.

The trocar/obturator-type laparoscopic access device versions described above may be used manually or may be arranged for attachment to a mechanical actuator (e.g. a robotic arm). As shown in FIG. 18, an embodiment of a trocar/obturator-type laparoscopic access device 182 modified for attachment to a mechanical actuator 181 may include an attachment sheath and actuator 183. The attachment sheath and actuator 183 may be fixed to the sharp inner obturator of the trocar/obturator-type construction access device and may be detachably fixed to an adapter or arm of the mechanical actuator 181. Electrical connectors 184 from the access device to the mechanical actuator 181 are situated to conduct signals from the various sensors to the mechanical actuator's control system and/or a gas dispensing system (not shown). Similarly, pneumatic conduits 185 from the access device 182 to the mechanical actuator 181 are situated to conduct signals from the various sensors to the mechanical actuator's 181 control system.

Figure 19:
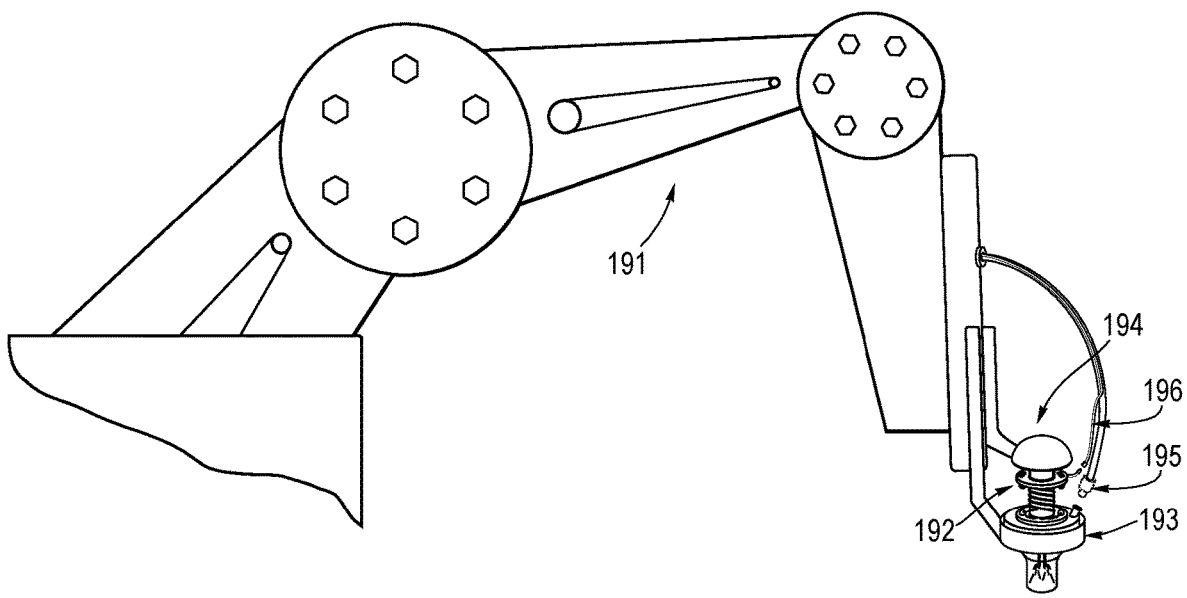
FIG. 19 is an alternative embodiment of the system of FIG. 18 and illustrates an isometric view of a trocar/obturator-type construction laparoscopic access device such as illustrated in FIGS. 14-15 positioned on a mechanical actuator, wherein the mechanical actuator may independently actuate the obturator and cannula of the laparoscopic access device.

Referring to FIG. 19, an alternative implementation of the embodiment of the mechanical actuator mounted version of FIG. 18 is shown. As seen in FIG. 19, a trocar/obturator-type laparoscopic access device 192 is arranged for attachment to a mechanical actuator 191, wherein the mechanical actuator 191 may independently actuate the obturator and cannula (e.g., distal end of trocar) of the access device 192. In this embodiment, both a primary attachment sheath and actuator 193, which is fixed to the blunt outer trocar of the trocar/obturator-type construction access device 192, and a secondary attachment sheath and actuator 194, which is fixed to the sharp inner obturator of the trocar/obturator-type construction access device 192 are included. Electrical connectors 195 from the access device to the mechanical actuator are situated to conduct signals from the various sensors to the mechanical actuator's 191 control system and/or a gas dispensing system. Pneumatic conduits 196 from the access device 192 to the mechanical actuator 191 are situated to conduct signals from the various sensors to the mechanical actuator's 191 control system.

The dimensions of the various access device embodiments described above (e.g., 11, 71, 81, 100, 123, 132, 140, 182, 192) and their subcomponents (e.g., 12, 13, 14, 15, 16, 141, 142) do not differ significantly from the rough dimensions of known counterparts in use today (e.g., existing Veress needles and trocars). In different embodiments of the present laparoscopic access device, dimensions for the pneumatic connection port (16, 82, 102, 143, 196) on the access device (11, 81, 100, 140, 192) may take on a range of sizes, having inner diameter from 2-20 mm; however, the in one embodiment it would utilize a standard ISO-594 Luer connection.

Referring to the embodiment of FIGS. 1-6, different component sizing configurations are contemplated. For example, the electrical connection port 17 at the top of the Veress needle-type access device 11 may be sized such that the connector is directly integrated into the body of the sharp outer sheath 14 or the top of the blunt inner sheath assembly 12, for example in a form factor of 1-2 mm×1-10 mm, comprising two or more conducting pins. This component may be designed as a standard interface such as USB-C, or a commodity 2.54 mm pitch/0.65 mm pin thickness header connector. Platforms 18, 20 within the access device 11 may have outer diameters sized to fit within the inner diameter of the outer grasping sheath 15 of the access device 11. Internal electrical components such as the force/pressure sensor(s) 22, optical sensor/emitter(s) 24, and inertial measurement units (IMUs) 26 may take on any dimensions suitable for containment within the respective platforms 18 and 20, including form factors common to practice within state-of-the-art electronics such as quad flat no-lead (QFN) packages, quad flat package (QFP), ball grid array (BGA), small outline integrated circuit (SOIC), mini small outline package (MSOP), and other compact and/or surface-mount profiles.

Figure 11:
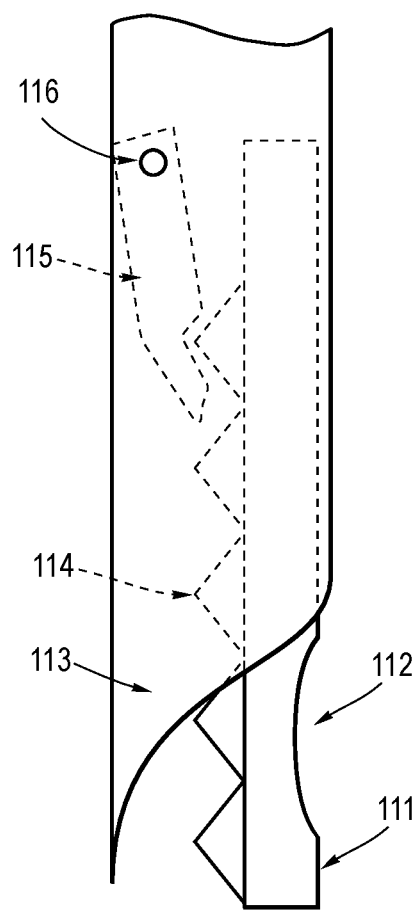
FIG. 11 is a cross-sectional view of an alternative embodiment of a distal end of the Veress needle-type construction laparoscopic access device.

The wireless communication module 103 in the access device 100 embodiment of FIG. 10 may be sized such that it fits entirely within the outer grasping sheath 15 of the access device. Alternately, it may also include an antenna which protrudes outside of the access device some distance, on the order of millimeters to several centimeters (<20 cm). In the embodiment of FIG. 11, the mechanical gradations 114 on the inner sheath 111 of a Veress needle-type construction may be sized such that the inner diameter of the outer sheath is less than 5 mm and the outer diameter of the blunt inner sheath is at least 0.5 mm; in one embodiment, the gradation height would be 0.25-1 mm, with a height to width ratio of not more than ½. An electrical switch lever 115 within the construction may be sized on a similar scale, with a mating structure sized comparably to the gradations and the lever arm sized from 0.5-5 mm.

Optical emitter/detector pairs may be sized to fit within the obturator distal tip. Such sizes may range from 0.25-5 mm widths or greater for both the emitter and detector components. (Obturator designs currently common to practice may have outer diameters of 5-12 mm, and may be partially hollowed to allow insertion of a laparoscope).

Regarding the composition of the various parts of the disclosed laparoscopic access devices, the body of the access device may include the use of plastic and/or metal materials common to the industry state of the art. The access device may further include the use of flexible printed circuit board materials. In one implementation, the access device may further include gyroscope & accelerometer sensor packages such as the Invensense MPU-6050 or the Invensense MPU-9250. It may further include optical distance sensors such as the SHARP/Socle Technology GP2Y0E02A and may further include piezoresistive force sensors such as the Honeywell FSS020WNGT or the Honeywell FMAMSDXX025WC2C3 and/or pressure-sensitive resistors such as the Ohmite FSR series FSR05CE.

The laparoscopic access device may further include the use of transparent or semi-transparent material(s) in the distal tip of the obturator, as depicted in FIG. 16; such materials may include any of various thermoplastics such as polycarbonate, poly(methyl methacrylate), polyethylene terephthalate (PET) and/or PET glycol-modified (PETG), cyclic olefin copolymers, and others.

Figure 20:
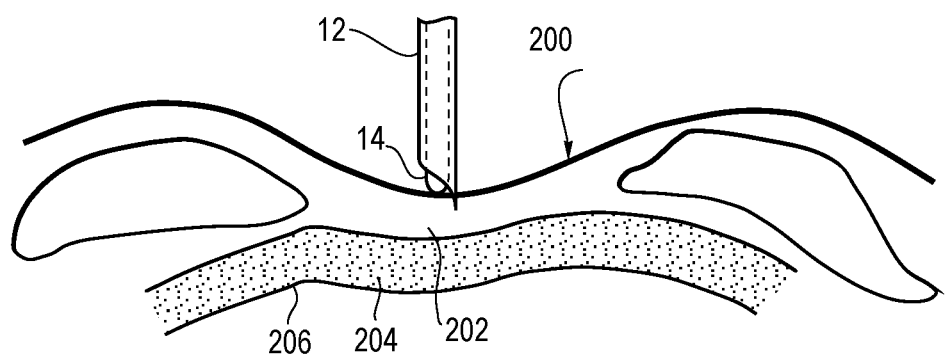
FIG. 20 illustrates a position of initial insertion of an embodiment of the laparoscopic access device into tissue adjacent a peritoneum.
Figure 21:
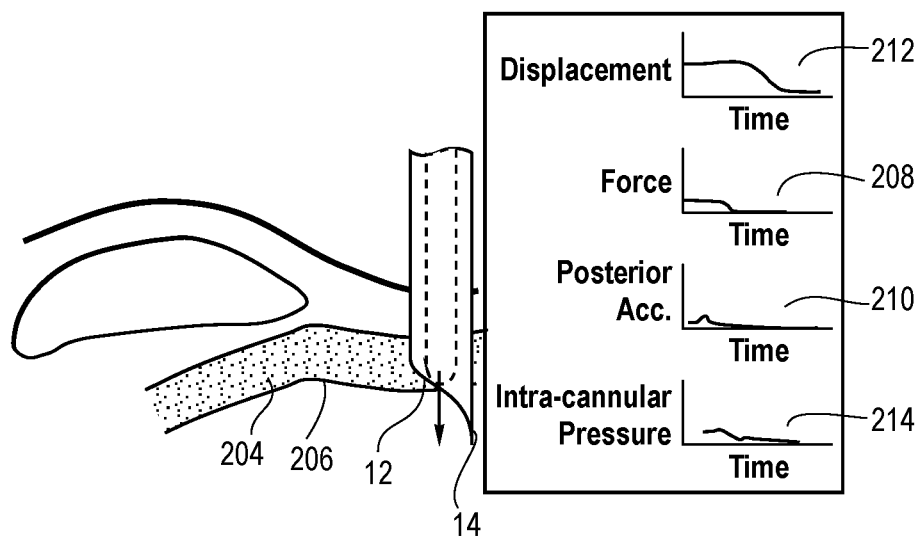
FIG. 21 Illustrates an embodiment of a laparoscopic access initially piercing through a wall of a peritoneum.

In one implementation, depicted in FIGS. 1-7, the laparoscopic access device 11, 71 may be in the form of a "smart" Veress needle and associated dataflow and processing system. Referring to the embodiment of FIGS. 1-7, in operation the following sequence may be utilized:

1. The surgeon connects the pneumatic device 60 via pneumatic conduit(s) 62 to the access device 11 via pneumatic connection port 16.
2. The surgeon manually inserts the sharp outer sheath 14 of the access device 11 through the abdominal wall by gripping and pressing on its proximal end 15, thereby actuating the sharp outer sheath 14 relative to the blunt inner sheath 12 thereby exposing the tissue to the sharp outer sheath 14. See, for example the initial penetration of the tissue wall 200 into the linear alba 202, but prior to piercing the transversalis fascia 204 into the peritoneum 206, by the distal end of the sharp outer sheath 14 in FIG. 20.
3. As this happens, the inner platforms (spring-loaded actuation platform 18 and base platform 20), fixed to the outer and inner sheaths 14, 12, respectively, are brought closer together. Each platform contains a printed circuit which comprises various embedded sensors, from which the following real-time data are collected:
    a. Displacement of the inner sheath 12 relative to the outer sheath 14 from optical distance sensor pair(s) 24 consisting of one or more light emitting diodes and one or more CMOS light sensors.
    b. 3D orientation from the inertial measurement unit(s)'s 26 gyroscope(s).
    c. 3D acceleration from the inertial measurement unit(s)'s 26 accelerometer(s).
    d. Applied longitudinal force from piezoresistive force sensor(s) 22, the sensors being placed in contact with the device's inner spring 19.
4. At this point, the gas introduction orifice 13 of the blunt inner sheath 12 is blocked by the sharp outer sheath 14, and thus the pressure within the blunt inner sheath 12 which is transmitted to the pneumatic device 60 via the pneumatic conduit 62 will be relatively static and comparable to a prior extracorporeal value, which may be recorded and saved during a preoperative calibration sequence.
5. Referring to FIG. 21, as the distal tip passes through the fascia 204 and parietal peritoneum 206, local maxima are observed in the axial force and posterior acceleration signals 208, 210, while the departure of the inner sheath 12 relative to its neutral position (i.e., displacement) exhibits a sudden drop (see hypothetical example tracked displacement signal at 212) as the peritoneum 206 is penetrated, thereby reducing the axial resistive force against the blunt inner sheath 12, allowing its spring mechanism to push it forward past the sharp outer sheath 14. This is accompanied by a simultaneous change in intra-cannular pressure in the blunt inner sheath 12 as intraperitoneal confluence is achieved (see hypothetical example tracked intra-cannular pressure signal at 214), which is transmitted to the pneumatic device 60 via pneumatic conduit(s) 62. This pressure is known as the "opening pressure," and is typically 5-7 mmHg in non-obese patients.

6. The opening pressure 75, along with other signal inputs from the sensors 72, 73 & 74 which are transmitted 76 to the pneumatic control device 77 via electrical conduit(s) 64 in real-time, where they may be synthesized via to determine the likelihood of proper position of the distal tip of the access device. This determination may be accomplished through the use of a Recurrent Neural Network or other suitable algorithm. Furthermore, as shown in FIG. 7, such signal input data 79 may be securely transmitted over a wired or wireless network to networked computer infrastructure 711 which store and process the data. Data processes may include tuning of an algorithm/training of a machine learning model, which is then transmitted 712 back across the network to the pneumatic control device 77 as a more robust algorithm/model.

7. At this point, the pneumatic control device 77 may also provide data 710 to a human-machine interface 713, which may provide visual, audible and/or haptic feedback (for example, with a haptic feedback circuit) to the user, for example, instructing the user to cease further introduction of the access device 71, or otherwise informing the user about the outcome of the process.

8. The pneumatic control device 77 controls pneumatic flow 78 back to the access device 71, continuously monitoring the pneumatic pressure 75 response via the pneumatic conduit(s) 62 as the flow rate 78 is increased, as a means of detecting any possible tissue occlusions on or near the distal tip and to detect proper creation of pneumoperitoneum as the cavity volume elevates the peritoneal wall and the access device 11 therein, which is sensed by the inertial measurement unit(s) 73, 26. All of this additional data 79 may be similarly transmitted and processed as described previously.

a. In the case of the variation depicted in FIG. 16, additional optical emitter/detector pair(s) 1412 detect reflectance from the tip of the device back through the cannula to confirm that no tissues are occluding the initial insufflation, and that the pneumoperitoneal size is increasing at the expected rate for the current insufflation flow rate, indicating that flow is properly directed into the pneumoperitoneal cavity.

Systems and methods for performing minimally invasive surgical procedures have been disclosed. The systems may include an insufflation source having a pneumatic pressure sensor, a computer network, a user interface, and a controller in communication with the insufflation source, the computer network and the user interface. The system may further include a surgical access device in communication with the controller and in pneumatic communication with the insufflation source, where a plurality of sensors attached to the surgical access device are configured to communicate real-time data with the controller via a data port. The laparoscopic access device may have a retractable blunt inner sheath and a pointed external sheath, or a centrally positioned pointed obturator movable through a blunt ended trocar. The sensors may sense distance to tissue, device orientation, force between tissue and device as is it inserted, opening pressure (intracorporeal pre-insufflation pressure), as well as pneumo pressure (insufflation pressure). The controller is configured to use the real-time sensed information to assist manual use or control robotic assisted movement of the surgical access device and control a gas flow from the insufflation source. The system may also be used with anatomical data, such as MRI or CT scan data to improve accuracy.

It is intended that the foregoing detailed description be regarded as illustrative rather than limiting, and that it be understood that it is the following claims, including all equivalents, that are intended to define the spirit and scope of this invention.

The invention claimed is:

1. A surgical access device comprising:
   an elongated tubular body having an outer sheath with an outer sheath proximal end and an outer sheath distal end, and having an inner sheath positioned inside the outer sheath, the inner sheath slidably movable coaxially relative to the outer sheath;
   the outer sheath distal end comprises a sharpened point and the outer sheath proximal end is attached to an access device gripping portion having an outer diameter greater than an outer diameter of the outer sheath;
   the inner sheath comprising a hollow tubular member having a blunt distal end and a proximal end defining a gas port, wherein the inner sheath comprises a lumen extending between the gas port and an exit port positioned adjacent the blunt distal end;
   a first flange movably positioned inside the access device gripping portion and fixedly attached to the inner sheath adjacent the proximal end of the hollow tubular member;
   a second flange positioned inside the access device gripping portion and slidably movable along an axis of the inner sheath via a biasing member attached to the first flange and positioned between the first flange and the second flange;
   at least one first sensor mounted to the first flange; and
   at least one second sensor mounted to the second flange and configured to cooperate with the at least one first sensor to generate and transmit real-time data relating to one or more of a displacement of the outer sheath relative to the inner sheath, an orientation of the surgical access device, or an acceleration of the surgical access device.

2. The surgical access device of claim 1, wherein the at least one first sensor comprises an optical sensor.

3. The surgical access device of claim 1, wherein the at least one first sensor comprises a gyroscopic sensor.

4. The surgical access device of claim 1, wherein the at least one first sensor comprises an accelerometer.

5. The surgical access device of claim 1, further comprising a data port positioned at a proximal end of the surgical access device adjacent the gas port.

6. The surgical access device of claim 5, further comprising a haptic feedback circuit configured to move the access device gripping portion in response to receiving an input received at the data port.

7. The surgical access device of claim 5, wherein the data port is a wired data port.

8. The surgical access device of claim 5, wherein the data port is a wireless data port comprising a transmitter and a receiver.

9. The surgical access device of claim 5, wherein the biasing member comprises a spring positioned between the first flange and the second flange.

\* \* \* \* \*